(No Model.)
T. LAROUCHE.
Thill Coupling.
No. 231,057. Patented Aug. 10, 1880.
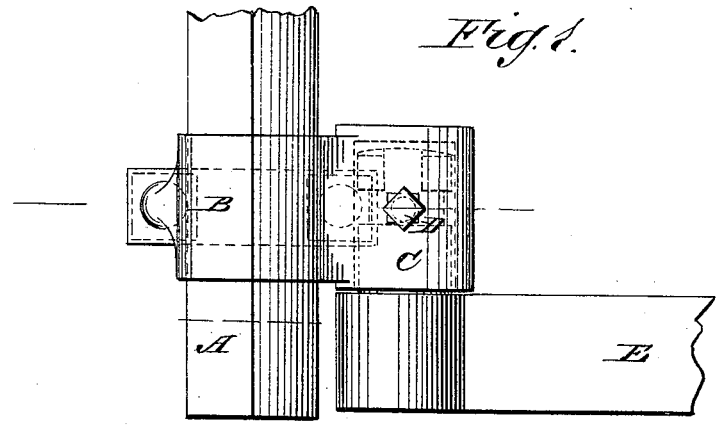
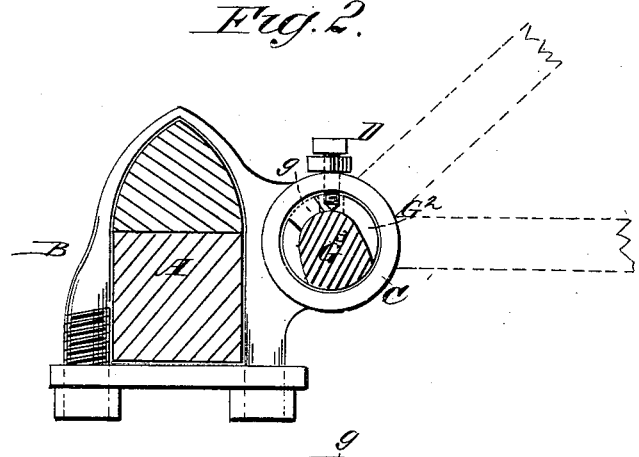
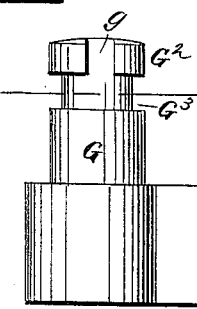
WITNESSES:
Francis McArdle
C. Sedgwick
INVENTOR:
T. Larouche
BY Munn & Co.
ATTORNEYS.

UNITED STATES PATENT OFFICE.

THEOPHILUS LAROUCHE, OF WILLIAMSTOWN, NEW YORK.

THILL-COUPLING.

SPECIFICATION forming part of Letters Patent No. 231,057, dated August 10, 1880.

Application filed May 24, 1880. (No model.)

*To all whom it may concern:*

Be it known that I, THEOPHILUS LAROUCHE, of Williamstown, in the county of Oswego and State of New York, have invented a new and useful Improvement in Thill-Couplings, of which the following is a specification.

My invention consists in a novel construction and form of the pivot of the thill-iron, and the combination therewith of a set-screw working in the socket of the clip, as hereinafter described.

In the accompanying drawings, Figure 1 is a top view of a thill-coupling embodying my improvements. Fig. 2 is a transverse vertical section of the same. Fig. 3 is a top view of the thill-iron.

Similar letters of reference indicate corresponding parts.

A represents the axle, and B the clip, which is attached in the usual manner by means of nuts on the screw-threaded ends of the clip, with a plate between them and the lower surface of the axle.

The clip B has formed with it a cylindrical socket, C, for engagement with the pivot of the thill-iron. In the top of this socket works a set-screw, D, the point of which extends into the interior of the socket.

The thill-iron E has its pivot formed as follows: The portion, G, nearest the shank is cylindrical. The extreme end, $G^2$, is cylindrical, with a notch, $g$, on its top-surface large enough to pass the point of the screw D, and the intermediate portion, $G^3$, has a peripherical groove extending about half-way around it, or slightly more than half-way, so as to give it a semi-elliptical form in its cross-section, as shown in Fig. 2.

In coupling, the thill the pivot is inserted laterally in the socket with the thill-iron E in the lowest of the two positions shown in dotted lines in Fig. 2. This position of the iron places the notch $g$ opposite the screw D, so that the pivot may be pushed home to its place in the socket. Then, when the thills are raised to the position which they occupy when in use, or lowered so as to allow their ends to rest on the ground when not in use, the notch $g$ passes to one side or the other of the screw D, causing said screw, by its engagement with the peripherical grooved portion $G^3$, to prevent the displacement of the pivot. The highest position is represented in dotted lines in Fig. 2.

In uncoupling, the iron is placed again in the lower of the two positions shown, with the notch $g$ in line with the screw, and the pivot may then be moved outward laterally.

Having thus described my invention, I claim as new and desire to secure by Letters Patent—

1. The thill-iron provided with a pivot having the portion G cylindrical, the portion $G^2$ cylindrical and provided with the notch $g$, and the intermediate portion, $G^3$, peripherically grooved, substantially as and for the purpose herein described.

2. The combination, with the thill-iron E and pivot G $G^2$ $G^3$, of the cylindrical socket C and set-screw D, substantially as and for the purpose herein described.

THEOPHILUS LAROUCHE.

Witnesses:
ROBERT J. CARTER,
WILLIAM HARPER.